United States Patent [19]

Zimmerman

[11] Patent Number: 4,730,244

[45] Date of Patent: Mar. 8, 1988

[54] POWER SUPPLY

[75] Inventor: Alan W. Zimmerman, Hanover Park, Ill.

[73] Assignee: Wells-Gardner Electronics Corporation, Chicago, Ill.

[21] Appl. No.: 4,114

[22] Filed: Jan. 16, 1987

[51] Int. Cl.⁴ .......................................... H02M 3/335
[52] U.S. Cl. ...................................... 363/49; 363/17; 363/132
[58] Field of Search ........................ 363/17, 24, 25, 26, 363/50, 52, 53, 56, 97, 98, 132, 133, 134; 323/277, 284, 285

[56] References Cited

U.S. PATENT DOCUMENTS

| | | | |
|---|---|---|---|
| 3,579,090 | 5/1971 | Madsen | 323/284 |
| 3,859,586 | 9/1973 | Wadlington | 363/56 |
| 4,099,225 | 7/1978 | Nyguard | 363/56 |
| 4,561,047 | 12/1983 | DePuy | 363/56 |
| 4,562,522 | 12/1985 | Adams et al. | 363/56 |

FOREIGN PATENT DOCUMENTS 0045038  4/1977  Japan ..................................... 363/56

Primary Examiner—Patrick R. Salce
Assistant Examiner—Judson H. Jones
Attorney, Agent, or Firm—McDermott, Will & Emery

[57] ABSTRACT

A regulated switching power supply is disclosed in which the high current set point, during regulation, is the peak (170a) of the regulated current instead of the peak (170) of the line frequency noise. The alternating current (14) is rectified (44, 46) and filtered (52, 54) and the output voltage is sensed and fed back (80) to an error amplifier (86) which provides an error signal that is repsponsive to the output voltage. The current levels is sensed (160) and a current sensing signal is provided to a first comparator (172) which is set to a first reference level prior to regulation. Once regulation occurs, the error amplifier (86) provides an error signal to a second comparator (180), which operates to change the reference level of the first comparator (172). In this manner, the error signal resulting when regulation occurs provides a reference level which enables the first comparator (172) to provide an output signal in response to a lower sensed current level than the sensed current level before regulation occurs.

21 Claims, 5 Drawing Figures

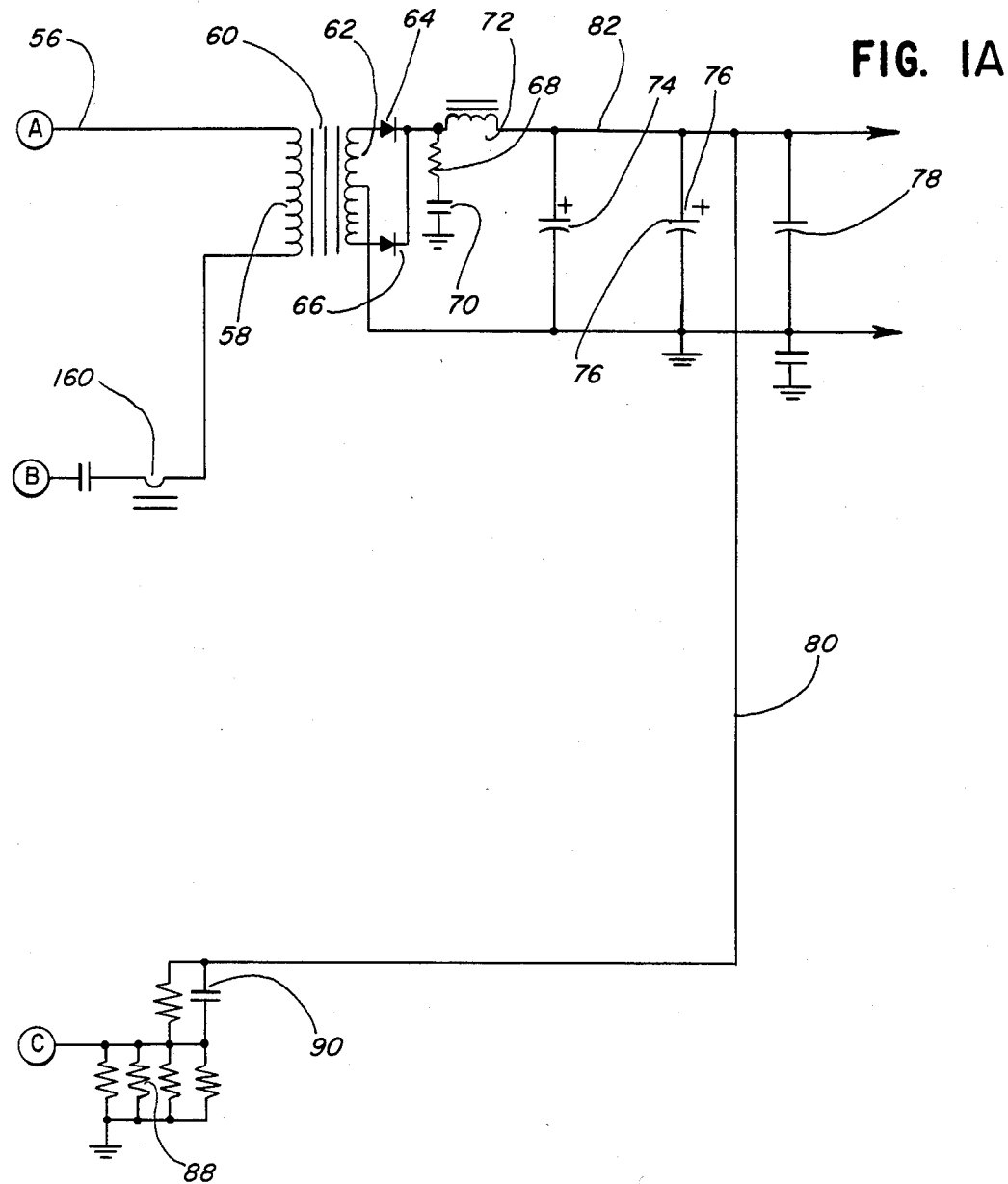

POWER SUPPLY

FIELD OF THE INVENTION

The present invention concerns a novel regulated power supply. Although the illustrative embodiment specifically concerns a switching power supply, the invention is also applicable to linear power supplies.

BACKGROUND OF THE INVENTION

In both switching and linear power supplies, current limiting is generally provided to prevent overcurrent and often shuts down the power supply if an overcurrent condition occurs. To this end, the high current set point is often the high point of the low frequency line frequency noise. In switching power supplies, for example, such low frequency line frequency noise is typically present when the power supply is initially energized. I have found, however, that once regulation occurs, the low frequency line frequency noise is substantially alleviated or obviated. I have discovered that it is not necessary to use the peak of the low frequency line frequency noise as the overcurrent set point once regulation occurs.

In accordance with the present invention, I have provided a regulated power supply in which the peak current including the noise is used as the overcurrent trip point before regulation, but once regulation occurs, the peak of the regulated current waveform is used as the trip point.

It is, therefore, an object of the present invention to provide a regulated power supply that is efficient in preventing overcurrent, without requiring the current set point to be always set at the high peak of the line frequency noise.

Other ojbects of the present invention will become apparent as the description proceeds.

BRIEF DESCRIPTION OF THE INVENTION

In accordance with the present invention, there is disclosed a regulated power supply which is coupled to a source of alternating current. The alternating current is rectified and filtered and the output voltage is sensed. An error amplifier is provided for providing an error signal responsive to the output voltage. The current level is sensed and means are provided for varying the sensing parameters in response to the error signal. In this manner, a first error signal provides a first sensed current level and a second error signal provides a second sensed current level. An output signal is provided in response to the sensed current level.

In the illustrative embodiment, the first sensed current level is the high current set point before regulation, which is the peak of the low frequency line frequency noise. The second sensed current level is the high current set point once regulation occurs, which is the peak of the regulated current waveform. To this end, the first error signal is provided when the current is not yet in a regulated condition and the second error signal is provided when the current is in a regulated condition.

In the illustrative embodiment, the means for varying the sensing parameters comprise a first comparator and a second comparator. The output of the second comparator is connected to an input of the first comparator. A first input signal is provided for the first comparator during the first error signal and a second, different input signal is provided for the first comparator during the second error signal.

In the illustrative embodiment, the power supply is a switching power supply in which the filtered AC is fed to a transformer having a primary and a secondary. Output means are provided for rectifying and filtering the current at the transformer secondary. The output voltage sensing means is connected to the output of the output rectifying and filtering means. A pulse width modulator is provided having an input coupled to the output voltage sensing means. Switching means are coupled to the output of the pulse width modulator for providing a variable duty cycle waveform to the transformer primary in response to the output voltage sensing means.

In the illustrative embodiment, the current level sensing means is connected to the transformer primary and is coupled to the first comparator for providing an input signal for the first comparator. The illustrative embodiment includes a soft start circuit coupled to an input of the pulse width modulator. The sensed current level output signal is fed to an input of the soft start circuit.

A more detailed explanation of the invention is provided in the following description and claims, and is illustrated in the accompanying drawings.

BRIEF DESCRIPTION OF THE DRAWINGS

FIGS. 1 and 1A comprise is a schematic circuit diagram of a regulated switching power supply constructed in accordance with the principles of the present invention.

FIG. 2 is a diagram of a rectified and filtered current waveform before regulation;

FIG. 3 is a diagram of the waveform of FIG. 1, viewed at a high frequency, prior to regulation;

FIG. 4 is a diagram of the waveform of FIG. 3, after regulation has occurred.

DETAILED DISCLOSURE OF THE THE ILLUSTRATIVE EMBODIMENT

Figure 1:
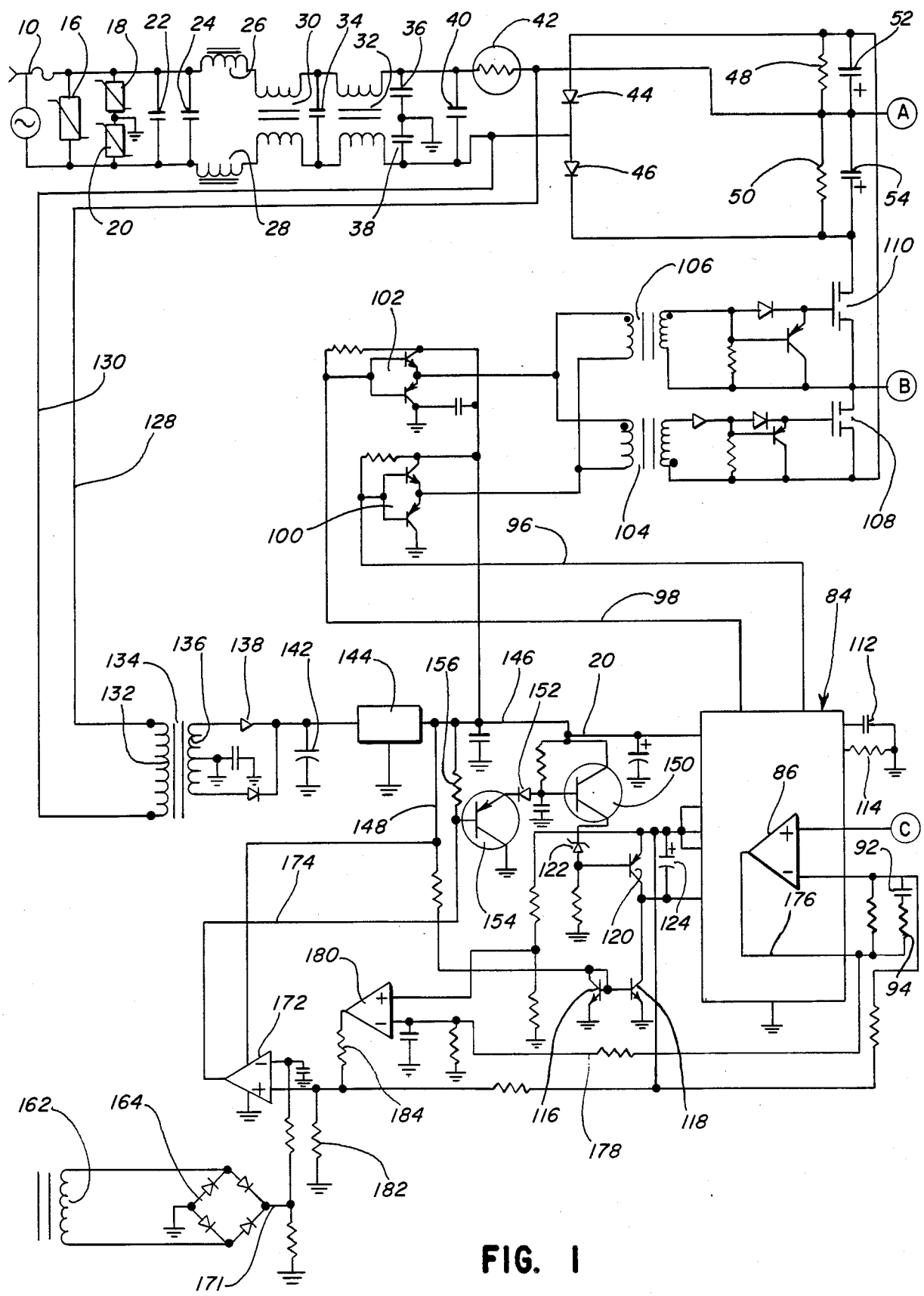

Referring to FIG. 1, input lines 10, 12 are connected to a suitable source of AC 14, preferably 120 volt 60 hertz household alternating current. The alternating current is fed through voltage transient suppressors 16, 18 and 20, to filter capacitors 22, 24, filter chokes 26, 28, 30, 32, filter capacitors 34, 36, 38 and 40, inrush current limiting thermistor 42, diode rectifiers 44, 46, bleeder resistors 48 and 50, and input filter capacitors 52 and 54.

The rectified and filtered alternating current is fed via line 56 to the primary 58 of a transformer 60. Connected to the secondary 62 of transformer 60 are diode rectifiers 64 and 66 and a noise snubber network comprising resistor 68 and capacitor 70, and the waveform is filtered by a choke 72 and capacitors 74, 76 and 78.

The output voltage is fed back via output voltage feedback line 80 which is connected to line 82. Feedback line 80 is coupled to pulse width modulation chip 84 which includes, among other things, an error amplifier 86. Feedback line 80 is coupled to the positive input of error amplifier 86 through a voltage divider network 88, which is used to divide the voltage on feedback line 80 to a predetermined amount. Error amplifier 86 is provided with a frequency compensation network which includes capacitor 90, capacitor 92 and resistor 94. A constant reference potential is applied to the inverting (negative) input of error amplifier 86 by internal means within pulse width modulator 84.

Pulse width modulator chip 84 operates to aid in controlling the switching of the rectified line voltage from filter capacitors 52 and 54 into the primary 58 of transformer 60. To this end, lines 96 and 98 provide the drive signals to output totem poles 110, 102, respectively, which drive gate drive transformers 104 and 106. The secondaries of gate drive transformers 104 and 106 provide further drive to FETs 108 and 110, respectively, which FETs are the main power switches. The pulse width drive from pulse width modulator 84 is in a half bridge configuration as is well-known in the art. Capacitor 112 and parallel connected resistor 114, coupled to pulse width modulated chip 84, determine the base switching frequency of the pulse width modulator 84.

The pulse width modulator 84 is provided with a soft start circuit which includes transistors 116, 118 , 120 zener diode 122 and capacitor 124. The soft start circuit is powered by means of a regulated direct current derived from lines 128, 130 connected across the main alternating current line to the primary 132 of transformer 134, the secondary 136 of which is connected via rectifiers 138, 140 and filter capacitor 142 to a voltage regulation chip 144 to provide the regulated direct current to the pulse width modulator chip 84 via line 146 and to provide regulated direct current to the soft start circuit via line 148.

Connected also to regulated DC line 146 are NPN transistor 150, the base of which is connected through diode 152 to PNP transistor 154, the base of which is connected through resistor 156 back to line 146. Transistors 150 and 154 serve as fast-acting buffers for the current limiting shutdown circuitry.

The current level sensing circuitry of the present invention will now be described. A transformer primary 160 is connected in series with the primary 58 of transformer 60. Transformer primary 160 serves to sense the current waveform which is fed through secondary 162 to a full wave rectifier 164 where the current waveform appears in the form shown in FIG. 2 when the power supply is energized, prior to regulation. The sensed current waveform has a 60 hertz waveform 166 impressed upon it so that when viewed at a high frequency as in FIG. 3, the current waveform 168 is increased in amplitude by the 60 hertz ripple component 166a.

In the prior art, it has been necessary to use a current limit set point for the overcurrent prevention circuit that is at least as high as the peak 170 of the 60 hertz ripple 166a. However, once regulation occurs, the 60 hertz ripple, i.e., noise, is alleviated or obviated. The regulated current waveform 168a is illustrated in FIG. 4. Thus, during regulation a lower current trip point 170a may be used. To this end, the circuit of FIG. 1 is set to provide an overcurrent trip point at peak 170 (FIG. 3) prior to regulation, but once regulation occurs the overcurrent set point will be lowered to level 170a. The waveforms shown in FIGS. 2–4 are the waveforms which appear at the output 171 of full wave rectifier 164.

To achieve this result, a first comparator 172 is used which is set prior to regulation for providing an appropriate output signal on line 174 if current level 170 is exceeded. Once regulation begins, however, first comparator 172 is modified to provide the output signal on line 174 when the lower current level 170a is exceeded. The modification of first comparator 172 is as follows. The output of error amplifier 86 is coupled via lines 176 and 178 to the inverting (negative) input of a second comparator 180. The positive input of first comparator 172 is used as the reference for the peak current sensed. Before regulation occurs, resistor 182 divides the voltage so that a predetermined voltage is applied to the positive input of first comparator 172. The predetermined voltage is set so that is anything higher than current level 170 is sensed on the negative input of first comparator 172, the output signal will be provided on line 174 to operate the shutdown circuitry and soft start circuit. Once regulation occurs, however, the error signal on line 176 will change and this will provide an output from comparator 180 which will effectively place resistor 184 in parallel with resistor 182, to change the voltage level at the positive input of first comparator 172. The voltage level at the positive input of first comparator 172 will now be such that first comparator 172 will provide an output on line 174 once the sensed current level exceeds current level 170a.

An output signal on line 74 will force the soft start circuit including transistors 116, 118, 120, 154 and 150 back into a soft start mode. This will operate as if the circuit is being initially turned on and it will then come up to regulation and again sense the current level. If the current level remains too high, the circuit will effectively be maintained in the soft start mode and will continually try to bring the supply into the regulation mode.

It can be seen that a novel regulated power supply has been provided in which the overcurrent limit set point is automatically changed once regulation of the current waveform commences. Although an illustrative embodiment of the invention has been shown and described, it is to be understood that various modifications and substitutions may be made by those skilled in the art without departing from the novel spirit and scope of the present invention.

What is claimed is:

1. A regulated power supply having an output voltage, which comprises:
 means for coupling the power supply to a source of alternating current;
 means for rectifying and filtering the alternating current;
 means for sensing the output voltage;
 an error amplifier for providing a first error signal and a second error signal responsive to the output voltage;
 means for sensing the current level;
 means for providing a first current level set point for said current level sensing means in response to the first error signal and for providing a second current level set point for said current level sensing means in response to the second error signal; and
 means for providing an output signal is response to sensed current level.

2. A regulated power supply as described in claim 1, wherein said first error signal is provided when the current is not yet in a regulated condition and said second error signal is provided when the current is in a regulated condition.

3. A regulated power supply as described in claim 1, said current set point providing means comprising a first comparator and a second comparator; means coupling the output of said second comparator to an inpput of said first comparator;
 means for providing a first input signal for said first comparator during said first error signal; and
 means for providing a second, different input signal for said first comparator during said second error signal.

4. A regulated power supply as described in claim 3, said second input signal being provided by decreasing said input signal to said first comparator by providing an output signal from said second comparator in response to said second error signal from said error amplifier; and means coupling the output of said error amplifier to an input of said second comparator.

5. A regulated power supply as described in claim 1, said first current level set point comprising a high point of line frequency noise and said second current level set point comprising peak current of the regulated current waveform.

6. A regulated power supply as described in claim 3, wherein said first error signal is provided before regulation has occurred and said second error signal is provided when regulation has occurred.

7. A regulated power supply as described in claim 1, wherein said power supply is a switching power supply in which the filtered alternating current is fed to a transformer having a primary and a secondary; output means for rectifying and filtering the current at the transformer secondary; means connecting said output voltage sensing means to the output of said output rectifying and filtering means; a pulse width modulator having an input coupled to said output voltage sensing means; switching means coupled to the output of said pulse width modulator for providing a variable duty cycle waveform to said transformer primary in response to said output voltage sensing means.

8. A regulated power supply as described in claim 7, in which said current level sensing means is connected to said transformer primary and is coupled to said varying means.

9. a regulated power supply as described in claim 8, in which said current set point providing means comprises a first comparator and a second comparator; means coupling the output of said second comparator to an input of said first comparator; said current level sensing means being coupled to an input of said first comparator for providing a first input signal for said first comparator; and means for providing a second, different input signal for said first comparator during said second error signal.

10. A regulated power supply as described in claim 9, said second input signal being provided by decreasing said input signal to said first comparator by providing an output signal from said second comparator in response to said second error signal from said error amplifier; and means coupling the output of said error amplifier to an input of said second comparator.

11. A regulated power supply as described in claim 7, including a soft start circuit coupled to an input of said pulse width modulator; and means for feeding said sensed current level output signal to an input of the soft start circuit.

12. A regulated switching power supply having an output voltage, which comprises:
means for coupling the power supply to a source of alternating current,
means for rectifying and filtering the alternating current;
means for feeding the filtered and rectified alternating current to a transformer having a primary and a secondary;
output means for rectifying and filtering the current at the transformer secondary;
means for sensing the output voltage;
means connecting said output voltage sensing means to the output of said output rectifying and filtering means;
a pulse width modulator having an input coupled to said output voltage sensing means;
switching means coupled to the output of said pulse width modulator for providing a variable duty cycle waveform to said transformer primary in response to said output voltage sensing means;
an error amplifier for providing a first error signal and a second error signal responsive to the output voltage;
means for sensing the current level;
means for providing a first current level set point for said current level sensing means in response to the first error signal and for providing a second current level set point for said current level sensing means in response to the second error signal; and
means for providing an output signal in response to sensed current level.

13. A regulated switching power supply as described in claim 12, wherein said first error signal is provided when the current is not yet in a regulated condition and said second error signal is provided when the current is in a regulated condition.

14. A regulated switching power supply as described in claim 13, said current set point providing means comprising a first comparator and a second comparator; means coupling the output of said second comparator to an input of said first comparator; means for providing a first input signal for said first comparator during said first error signal; and means for providing a second, different input signal for said first comparator during said second error signal.

15. A regulated switching power supply as described in claim 14, said second input signal being provided by decreasing said input signal to said first comparator by providing an output signal from said second comparator is response to said second error signal from said error amplifier; and means coupling the output of said error amplifier to an input of said second comparator.

16. A regulated switching power supply as described in claim 12, said first current level set point comprising a high point of line frequency noise and said second current level set point comprising peak current of the regulated current waveform, said first error signal being provided before regulation has occurred and said second error signal being provided when regulation has occurred.

17. A regulated power supply having an output voltage, which comprises:
means for coupling the power supply to a source of alternating current;
means for rectifying and filtering the alternating current;
means for sensing the output voltage;
an error amplifier for providing a first error signal and a second error signal responsive to the output voltage;
means for sensing the current level;
means for providing a first current level set point for said current level sensing means in response to the first error signal and for providing a second current level set point for said current level sensing means in response to the second error signal;
means for providing an output signal is response to sensed ccurrent level;

said first error signal being provided when the current is not yet in a regulated condition and the second error signal being provided when the current is in a regulated condition;

said current set point providing means comprising a first comparator and a second comparator;

means coupling the output of said second comparator to an input of said first comparator;

means for providing a first input signal for said first comparator during said first error signal;

means for providing a second different input signal for said first comparator during said second error signal;

said second input signal provided by decreasing said input signal to said first comparator by providing an output signal from said second comparator in response to said second error signal from said error amplifier;

means coupling the output of said error amplifier to an input of said second comparator;

said first current level set point comprising a high point of line frequency noise and said second current level set point comprising peak current of the regulated current waveform.

18. A regulated power supply as described in claim 17, wherein said power supply is a switching power supply in which the filtered alternating current is fed to a transformer having a primary and a secondary; output means for rectifying and filtering the current at the transformer secondary; means connecting said output voltage sensing means to the output of said output rectifying and filtering means; a pulse width modulator having an input coupled to said output voltage sensing means; and switching means coupled to the output of said pulse width modulator for providing a variable duty cycle waveform to said transformer primary in response to said output voltage sensing means.

19. A regulated power supply as described in claim 18, said current level sensing means being connected to said transformer primary and coupled to said varying means.

20. A regulated power supply as described in claim 19, said current level sensing means being coupled to an input of said comparator for providing a first input signal for said first comparator.

21. A regulated power supply as described in claim 20, including a soft start circuit coupled to an input of said pulse width modulator; and means for feeding said sensed current level output signal to an input of the soft start circuit.

* * * * *